Patented June 23, 1942

2,287,088

UNITED STATES PATENT OFFICE 2,287,088

PROCESS FOR PRODUCING MAGNESIUM ALCOHOLATES

Charles A. Cohen, Elizabeth, N. J., assignor to Standard Oil Development Company, a corporation of Delaware No Drawing. Application December 28, 1939, Serial No. 311,322

2 Claims. (Cl. 260—632)

The present invention relates to an improved process for the production of the alcoholates of the alkaline earth metals.

Attempts have been made to make alkaline earth alcoholates by a method similar to the Grignard synthesis which have resulted, however, in double compounds and not in true alcoholates.

This invention has as its principal object the provision of a method whereby the metals of the second group in the periodic table, that is to say, the alkaline earth metals, may be caused to react directly with alcohol to yield alkaline earth alcoholates. Another and further object of this invention is the production of alkaline earth alcoholates in a pure or substantially pure state. Other and further objects of the invention will become apparent to those skilled in the art as the description progresses.

It has been observed that the metallic alkaline earth, if freshly cut so as to expose an unoxidized surface, will react slightly with an absolutely anhydrous alcohol, that is, with an alcohol containing 0.4% or less of water. However, the rate of reaction between an alkaline earth metal and an absolutely anhydrous alcohol is extremely slow and the percentage yield of alcoholate is very poor. Absolutely anhydrous alcohol may be prepared according to the method described in my copending application Serial No. 311,591 filed on December 29, 1939.

It has now been found that the reaction between an alkaline earth metal and an absolutely anhydrous alcohol may be caused to proceed rapidly and with subsequent good yields if the reaction is carried out in the presence of a suitable activator. When the reaction is carried out in the presence of an activator, the metallic reactants need not necessarily present a fresh unoxidized surface. The reacted alcohol may be any of the mono-hydric alcohols of sufficient purity as, for example, absolutely anhydrous methyl alcohol, ethyl alcohol, isopropyl alcohol, etc. The metallic reactants may be one of the alkaline earth metals, such as calcium or magnesium. Suitable activators for the reaction are aluminum, mercuric salts, iodine, or anhydrous stannic chloride, any of which may be used either singly or in combination. For most purposes for which the alcoholates are to be used the activator is present in the final product in non-appreciable amounts. If, however, a pure alcoholate is desired, a proper choice of catalyst or manipulative steps assure this result. Mercuric salts decompose yielding metallic mercury which appears in the bottom of the reaction chamber and the acid of the negative radical which remains dissolved in the excess alcohol. Iodine and aluminum react to give products soluble in the excess alcohol. Stannic chloride yields insoluble alcoholates which remain in the alkaline earth alcoholates unless special precautions to assure pure alkaline earth alcoholates are practiced. The reaction is initiated on slight heating but once it is started, becomes exothermic and appropriate means for dissipating the excess heat should be provided. A reaction vessel should be provided constructed of non-corrodible material such as glass, glazed ceramic material, nickel or a vessel lined with some non-corrodible material. If the presence of aluminum or tin alcoholates is not detrimental to the use for which the alkaline earth alcoholate is to be used, aluminum may be added directly to the alkaline earth metal in the proportions of from a fraction of a per cent to as much as 10% by weight on the alkaline earth metal. The aluminum may be present as a purified metallic granular powder, or may be alloyed with the alkaline earth metal or may be added to the alkaline earth metal in the form of aluminum alcoholate. The effect of the addition of the aluminum is to react in situ with any trace of water which could be present in the alcohol or which may have been absorbed from the atmosphere during handling. When metallic aluminum is used it may be desirable to add a small quantity of a mercuric salt, such as mercuric chloride, in order to further activate both the alkaline earth metal and the aluminum. If desired, either iodine or stannic chloride or both may be used to initially activate the alkaline earth metal.

The following examples are given for the purpose of illustrating the various aspects of the invention:

*Example 1*

50 parts by weight of magnesium turnings were mixed in a non-corrodible vessel with one part by weight of granular aluminum, a few crystals of iodine and 0.5 part by weight of mercuric chloride. The reaction vessel was then warmed until vapors of iodine appeared, 785 parts by weight of absolutely anhydrous isopropyl alcohol were then added. The mixture was heated to about 50° C. and 2.5 parts by weight of anhydrous stannic chloride added. Vigorous action ensued which was controlled by cooling. After the reaction subsided, the mixture was heated under reflux, protecting the contents of the vessel from carbon dioxide and moisture by means of a container of calcium chloride and soda-lime attached to the top of the reflux column. Heating was continued for three hours after which the mixture was allowed to stand at room temperature for about 12 hours. An analysis shows that 95% of the magnesium had been converted to magnesium isopropylate. The product was a greyish slurry of crystalline magnesium isopropylate suspended in the excess alcohol. The reaction product obtained will vary, appearing at times as a white to grey gelatinous mass. The reaction product may be used as an alcohol slurry or the mixture may be freed from excess alcohol and the magnesium isopropylate dissolved or dispersed in an inert medium. For example, the alcoholic slurry of the magnesium isopropylate may be added to water-white highly refined mineral oil known as a white oil, of proper viscosity, the alcohol removed by heating at atmospheric or reduced pressure, and the resulting slurry of the magnesium isopropylate in oil ground by milling in a ball mill or colloidal mill. The products of this invention, either as the reaction mixture or purified form, are useful in the refining of corrosive oils.

*Example 2*

50 parts by weight of magnesium turnings, one part by weight of granular aluminum, a few crystals of iodine and 0.5 part by weight of mercuric chloride were placed in a glass vessel and heated until the iodine started to vaporize. 790 parts by weight of absolutely anhydrous ethyl alcohol was added and the mixture heated until the reaction became vigorous. The temperature was maintained at approximately 50° C. by cooling, and after the reaction had somewhat subsided, the mixture was heated under a reflux for about 3 hours. During the reaction, the reactants were protected from carbon dioxide and moisture. The reaction mixture was then permitted to stand at room temperature overnight. The drop of mercury appearing in the bottom of the vessel was removed. The reaction product was then filtered and the precipitate dried, yielding 225 parts by weight of a mixture of aluminum and magnesium ethylate.

*Example 3*

50 parts by weight of magnesium turnings and a few crystals of iodine were placed in a glass vessel equipped to receive a reflux condenser. In a separate distilling flask were placed 790 parts by weight of absolutely anhydrous isopropyl alcohol and 1 part by weight of granular aluminum. The distilling flask was connected to the reflux condenser over the magnesium turnings. The alcohol was distilled conducting the vapors into the vessel containing the magnesium turnings. In the meantime, the magnesium turnings and iodine were heated so that vapors of iodine appeared just prior to the time when the distillate from the distilling flask reached the vessel containing the magnesium and iodine. After all the alcohol had been distilled, the distilling flask was disconnected and provisions made for protecting the reaction mixture from carbon dioxide and moisture. The mixture was then refluxed for 3 hours, after which it was permitted to stand overnight at room temperature. The reaction mixture was then filtered and the precipitate dried, yielding 265 parts by weight of magnesium isopropylate.

The foregoing disclosure and examples are given for the purposes of illustration only, and are not to be construed as in any way limiting the invention.

What is claimed is:

1. A process for the production of magnesium alcoholate which consists in activating magnesium metal with iodine and mercuric chloride, adding an excess of absolutely anhydrous alcohol together with sufficient granular aluminum to maintain the reaction in an anhydrous condition, refluxing the mixture until the reaction is complete, separating metallic mercury from the reaction mixture, filtering to remove the excess alcohol together with the reaction products of iodine and aluminum and recovering the magnesium alcoholate.

2. A process for the production of magnesium isopropylate which consists in activating magnesium metal with iodine and mercuric chloride, adding an excess of absolutely anhydrous isopropyl alcohol together with sufficient granular aluminum to maintain the reaction in an anhydrous condition, refluxing the mixture until the reaction is complete, separating metallic mercury from the reaction mixture, filtering to remove the excess alcohol together with the reaction products of iodine and aluminum and recovering the magnesium isopropylate.

CHARLES A. COHEN.